G. F. ARMSTRONG.
METHOD OF MAKING PUNCTURE PROOF TIRE TUBES.
APPLICATION FILED MAY 11, 1918.
1,311,738.
Patented July 29, 1919.
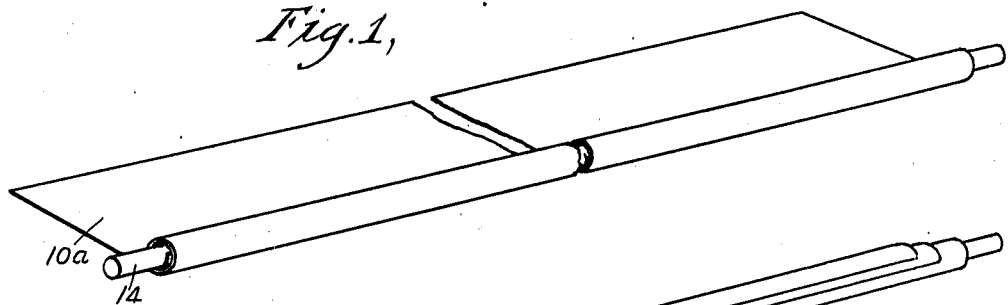
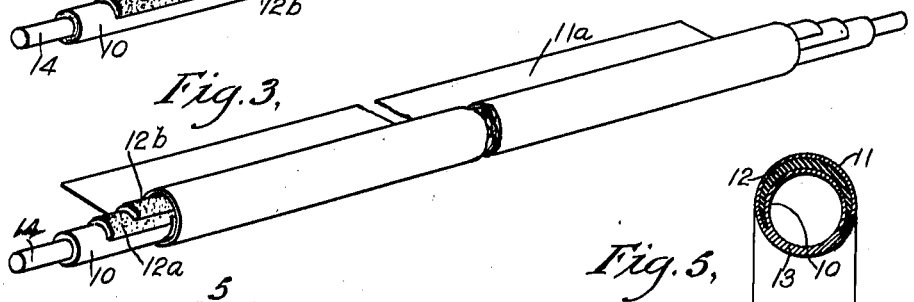
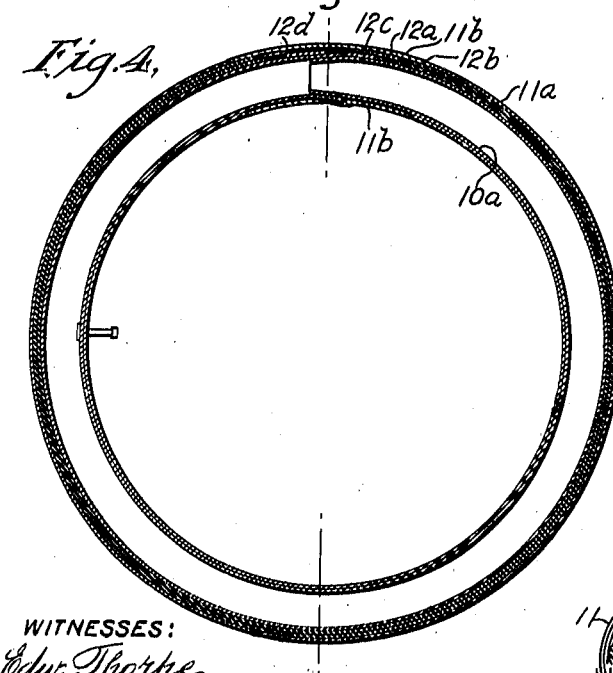
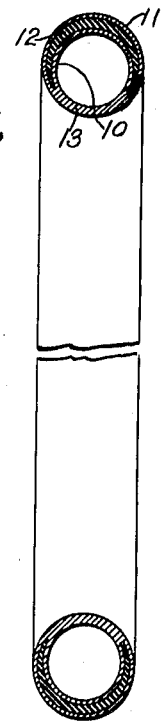
INVENTOR
G. F. Armstrong
BY
ATTORNEYS
WITNESSES:

UNITED STATES PATENT OFFICE.

GEORGE F. ARMSTRONG, OF RUTHERFORD, NEW JERSEY.

METHOD OF MAKING PUNCTURE-PROOF TIRE-TUBES.

1,311,738.  Specification of Letters Patent.  Patented July 29, 1919.

Application filed May 11, 1918. Serial No. 233,962.

*To all whom it may concern:*

Be it known that I, GEORGE F. ARMSTRONG, a citizen of the United States, and a resident of Rutherford, in the county of Bergen and State of New Jersey, have invented new and Improved Methods of Making Puncture-Proof Tire-Tubes, of which the following is a full, clear, and exact description.

This invention relates to puncture proof tubes such as inner tubes commonly used in pneumatic wheels for bicycles, motorcycles, automobiles, or the like, and has particular reference to the manner or method of manufacturing the puncture proof element or tube with respect especially to the composition of matter carried thereby.

While I employ this improved method in my business almost exclusively in the manufacture of inner tubes for pneumatic tires, I wish it to be understood that the same method may be employed in the manufacture of single tube tires. By the term "tube" therefore I mean to cover either an inner tube or a single tube tire. The tube as an article of manufacture, having contained in it as a composite part thereof the puncture proof material, is covered by my co-pending application Serial No. 186,599, filed August 16, 1917, and hence the present subject matter relates strictly to the method or manner of making the tube. In the description of the various steps of this method reference is to be had to the accompanying drawings in which—

Figure 1 is a perspective view indicating the rolling of a sheet of thin rubber upon a mandrel.

Fig. 2 indicates the next step which consists in laying strips of the viscous semi-fluid puncture proof material upon the innermost tubular roll of rubber while still on the mandrel.

Fig. 3 indicates a succeeding step in which another sheet of this rubber is rolled upon the viscous composition.

Fig. 4 is a sectional view indicating the manner of connecting the ends of the tube prior to vulcanization.

Fig. 5 is a vertical transverse section on the line 5—5 of Fig. 4 showing the completed tube after vulcanization; and Fig. 6 is an enlarged cross sectional detail indicating approximately the relative forms and positions of the component parts of the tube just prior to vulcanization.

With respect to structure or composition the finished tube comprises an inner member 10 and an outer member 11 spaced from each other along the sides and tread portion forming a pocket filled with an annular mass of semi-fluid viscous composition indicated at 12, the cross section of which is crescent shaped as shown clearly in Fig. 5. The members 10 and 11 along their rim portion or the portion thereof remote from the tread merge into a single solid rubber portion indicated at 13.

The tread portion as indicated is materially thicker than the rim portion 13, the structure indicated providing that in the event of a cut or puncture taking place along the tread or sides the instrument or device causing the disturbance causes a portion of the healing material or composition 12 adhering thereto to be drawn outward into or through the wound thus formed in the portion 11 filling the same and preventing the escape of air.

The viscous composition 12 is of any suitable nature of a semi-fluid consistency but which has solidity or body enough to prevent the flow thereof circumferentially of the tube or accumulation of abnormal portions thereof at any part of the cavity in which it is located. The composition that I have used extensively and with uniform success is that covered by Letters Patent of the United States, No. 1,257,780, issued to me on the 26th day of February, 1918, which composition is of such a nature as to be handled in strips as will be more fully set forth below.

In the practice of this invention and as indicated in Fig. 1 the first step in the method of building up a tire tube is to roll a sheet of thin rubber 10ª, or sufficient thereof to produce the member 10 and that portion of the body 13 that pertains thereto, upon a long straight round mandrel 14, the length of the mass of rubber thus rolled upon the mandrel being slightly greater than the circumference of the tube. After the desired number of plies of the rubber to produce the required thickness of the inner portion of the tube are rolled upon the mandrel any remaining portion of the sheet is clipped or trimmed off leaving the inner portion 10 of the rubber rolled in tubular form as shown in Figs. 2 and 3.

As indicated in Fig. 2 the next step is to apply a strip 12$^a$ of the viscous material along one side of the tube 10, the material being previously rolled into sheets of practically uniform thickness, such thickness approximating one half of the thickest portion of the material 12 at the tread. The width of the strip 12$^a$ approximates one half of the circumference of the cross section of the tube as indicated in Fig. 6, while the length thereof is slightly less, there being left a projecting end portion of the member 10 at each end of perhaps several inches. I next apply another strip 12$^b$ of the viscous composition directly upon the outer face of the strip 12$^a$ narrower than the strip 12$^a$, and also shorter at both ends as plainly indicated in Figs. 2 and 3. Even though the viscous material may be of uniform thickness no attention need be paid to the angular edges thereof as indicated in Fig. 6 at this stage of the process.

The next step is to roll the assemblage within another thin sheet 11$^a$ of rubber of the same character as the first sheet 10$^a$ and of sufficient number of plies to form the body of the portion 11, this element of the assemblage being preferably slightly shorter than the second ply 12$^b$ of viscous composition.

The mandrel is then slipped out of the tubular assemblage and the tubular structure is then bent into annular form as shown in Fig. 4 with a portion of one projecting end of the member 10 telescoped or otherwise projected into or overlapping the opposite end portion of the same member, care being taken to have the members 12$^a$ and 12$^b$ arranged in circumferential alinement though they are spaced from one another as indicated in Fig. 4, the space between the opposing ends of the strip 12$^b$ being greater than that between the corresponding ends of the strip 12$^a$.

I then fill in the space between the ends of the strip 12$^a$ with a short strip of the same material and of the same width as the strip 12$^a$ as indicated at 12$^c$. This is followed by the application of a strip of the same 12$^d$ applied directly over the strip 12$^c$ and overlapping the joints between the same and the strip 12$^a$ making a uniform mass of viscous material entirely around the tube. I then apply more of the thin rubber sheeting covering the joint occasioned by the overlapping or telescoping of the ends of the member 10 and the applied short strips of viscous material and filling the remaining space between the opposed ends of the tubular member 11$^a$ or as indicated at 11$^b$.

After the tube is thus completely built up of its component elements it is put into a suitable mold, blown up under air pressure and vulcanized in any well known manner by the use of live steam or other heat process well understood in this art. The pressure applied will serve immediately to so form the edge portions of the strips 12$^a$ and 12$^b$ as to cause the same to taper and fill the gaps indicated in Fig. 6, and causing also the extreme edges of the inner strip 12$^a$ to extend around somewhat into the form shown in Fig. 5. As the vulcanizing process continues, however, all portions of the pure rubber 10 and 11 in direct contact become formed into a solid mass of rubber and also the two strips of viscous material merge into one. The viscous material partakes also of the vulcanizing process becoming slightly firmer but not losing its viscosity to such an extent as to defeat its purpose. The surface portions furthermore of the member 12 incident to the vulcanizing process are caused to adhere reliably to the adjacent surfaces of the members 10 and 11 so as to reduce the possibility of any circumferential flow thereof in the pocket.

It will thus be seen that the tube formed by this process is provided with a continuous annular pocket along or around its tread portion, the same being filled during the process of building up of the tubular structure with a composition of matter sufficiently fluid to automatically heal an ordinary puncture and yet having sufficient body to prevent any possible flow thereof circumferentially along said pocket.

I claim:

1. The herein described process of forming a pneumatic tire tube of an endless seamless construction, the same comprising (1) the rolling of sheet rubber upon a straight mandrel of a length slightly greater than the circumference of the finished tube until a sufficient mass of rubber is produced to form the innermost section of the tube; (2) then applying longitudinally on one side of this roll in successive layers of unequal width a mass of semi-liquid viscous composition; (3) then rolling on the outside of the innermost section and composition more sheet rubber to form the outermost section of the tube; (4) then removing the tubular structure from the mandrel and bending the same into annular form and substantially uniting the ends thereof, and (5) vulcanizing the entire mass under heat and pressure.

2. The herein described process of making pneumatic tire tubes, the same comprising (1) the formation of an open ended inner tube section of rubber-like material; (2) then applying along one side of the innermost section thus formed a strip of semi-liquid viscous composition of a width approximately one half the cross sectional circumference of the previously formed tube, but of less length than said tube; (3) then applying around the previously formed tube and strip of viscous material an outer section of rubber-like material of less length than the viscous material; (4) next bending the tubular structure around into endless form bringing the ends of the section first formed into overlapping relation to each other; (5) then filling in the gaps between the ends of the viscous material and the outer section with similar materials making a substantially uniform structure throughout, and finally vulcanizing the mass so formed under heat and pressure.

GEORGE F. ARMSTRONG.